US009694791B2

(12) United States Patent
Kamo

(10) Patent No.: US 9,694,791 B2
(45) Date of Patent: Jul. 4, 2017

(54) VEHICLE PARKING CONTROL APPARATUS

(71) Applicant: HONDA MOTOR CO., LTD., Tokyo (JP)

(72) Inventor: Shunji Kamo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/439,950

(22) PCT Filed: Oct. 29, 2013

(86) PCT No.: PCT/JP2013/079196
§ 371 (c)(1),
(2) Date: Apr. 30, 2015

(87) PCT Pub. No.: WO2014/069429
PCT Pub. Date: May 8, 2014

(65) Prior Publication Data
US 2015/0291134 A1 Oct. 15, 2015

(30) Foreign Application Priority Data

Nov. 2, 2012 (JP) ................. 2012-243107

(51) Int. Cl.
*B60T 7/12* (2006.01)
*B60T 1/00* (2006.01)
(Continued)

(52) U.S. Cl.
CPC ............... *B60T 7/12* (2013.01); *B60T 1/005* (2013.01); *B60T 1/065* (2013.01); *B60T 7/042* (2013.01);
(Continued)

(58) Field of Classification Search
CPC ... B60T 7/12; B60T 7/042; B60T 8/24; B60T 8/32; B60T 13/662; B60T 13/683; F16H 2059/663; F16D 55/225; F16D 55/226
See application file for complete search history.

(56) References Cited

U.S. PATENT DOCUMENTS 4,664,218 A * 5/1987 Graham ................. B60T 7/122
180/272
2006/0108956 A1* 5/2006 Clark ...................... B60L 3/108
318/139

(Continued)

FOREIGN PATENT DOCUMENTS

JP 2007-55354 A 3/2007
JP 2008-307996 A 12/2008
JP 2009-166775 A 7/2009

OTHER PUBLICATIONS

International Search Report dated Dec. 10, 2013 issued in corresponding application No. PCT/JP2013/079196.

*Primary Examiner* — Adam Tissot
*Assistant Examiner* — Aaron Smith
(74) *Attorney, Agent, or Firm* — Westerman, Hattori, Daniels & Adrian, LLP

(57) ABSTRACT

At a time of causing a parking mechanism to execute parking process to switch a parking gear to a locked state when a predetermined parking condition is established and a detected road surface gradient is equal to or greater than a predetermined value, it is determined whether a foot brake has been operated, operation of an automatic braking system is controlled to make a travel speed of the vehicle greater than zero but equal to or less than a set speed if it is determined that the foot brake has not been operated, and the parking process is then executed.

10 Claims, 6 Drawing Sheets

(51) Int. Cl.

| | |
|---|---|
| *B60T 1/06* | (2006.01) |
| *B60T 7/04* | (2006.01) |
| *F16D 63/00* | (2006.01) |
| *F16H 63/48* | (2006.01) |
| *B60T 8/24* | (2006.01) |
| *B60T 8/32* | (2006.01) |
| *F16H 59/66* | (2006.01) |

(52) U.S. Cl.
CPC ...... *B60T 8/24* (2013.01); *B60T 8/32* (2013.01); *F16D 63/006* (2013.01); *F16H 63/486* (2013.01); *B60T 2240/06* (2013.01); *F16H 2059/663* (2013.01)

(56) References Cited

U.S. PATENT DOCUMENTS

| | | | |
|---|---|---|---|
| 2008/0173121 A1* | 7/2008 | Kimura | F16H 61/12 74/473.12 |
| 2009/0326767 A1* | 12/2009 | Kamada | B60T 1/005 701/48 |
| 2010/0161187 A1* | 6/2010 | Ito | F16H 61/12 701/58 |
| 2010/0181823 A1* | 7/2010 | Eberling | B60T 7/12 303/9.76 |

* cited by examiner

VEHICLE PARKING CONTROL APPARATUS

TECHNICAL FIELD

This invention relates to a vehicle parking control apparatus, more specifically to a shift-by-wire type vehicle parking control apparatus.

BACKGROUND ART

A direct-type parking mechanism uses a wire connected to a shift lever to enable switching of a parking gear fastened to an output shaft of an automatic transmission between a rotatable unlocked state and an non-rotatable locked state. As an alternative, a shift-by-wire type parking mechanism has recently been developed that does away with the wire-to-gear mechanical connection by using an actuator connected to the parking gear to operate the gear.

During the process of parking, the shift-by-wire type parking mechanism needs more time than the direct type to switch from the unlocked state to the locked state. So when the gradient of the road surface the vehicle sits on is equal to or greater than a certain angle, the vehicle is liable to creep or roll down during parking and thus make it difficult for the parking wire to establish the locked state by pulling the parking pole.

Patent Reference 1 therefore proposes that at the time of putting the parking mechanism in the locked state, the vehicle's driven wheels be put in a non-rotating condition by, for example, automatic braking or operating the automatic transmission to generate driving force in the opposite direction from the torque inputted from the driven wheel side.

PRIOR ART REFERENCES

Patent References

Patent Reference 1:
Japanese Laid-Open Patent Application No. 2008-307996

SUMMARY OF INVENTION

Problems to be Solved by the Invention

Although the technique of Patent Reference 1 achieves the locked state during parking when applied in the foregoing manner, a contrary risk arises that upon realizing that the vehicle has been stopped the driver may take his or her foot off the foot brake before the parking mechanism establishes the locked state and forget to operate the parking brake before leaving the vehicle.

The object of this invention is therefore to overcome this inconvenience by providing a vehicle parking control apparatus configured so that when the vehicle is parked on a road surface whose gradient is equal to or greater than a predetermined value, establishment of the locked state of the parking mechanism is facilitated during the parking process and the driver is prompted to operate the foot brake and the parking brake.

Means for Solving the Problems

In order to achieve the object, in claim 1, it is configured to have an apparatus for controlling parking of a vehicle having an automatic transmission connected to a power source mounted in the vehicle to change speed of rotation of the power source inputted to an input shaft and transmit from an output shaft to driven wheels; a shift-by-wire type parking mechanism that enables a parking gear connected to the output shaft of the automatic transmission to be switched between a rotatable unlocked state and an non-rotatable locked state; a foot brake that enables braking of the vehicle in response to brake pedal operation by a driver; an automatic braking system that enables braking of the vehicle independently of the aforesaid brake pedal operation; a stop detection means adapted to detect stopping of the vehicle; a road surface gradient detection means adapted to detect a gradient of a road surface where the vehicle is located; and a vehicle travel speed detection means adapted to detect a travel speed of the vehicle, wherein the improvement comprises: a parking mechanism control means adapted to cause the parking mechanism to execute parking process to switch the parking gear to the locked state when a predetermined parking condition is established and the detected road surface gradient is equal to or greater than a predetermined value; wherein the parking mechanism control means determines whether the foot brake has been operated when causing the parking mechanism to execute the parking process, executes a travel speed control for controlling operation of the automatic braking system to make the travel speed of the vehicle greater than zero but equal to or less than the set speed, if it is determined that the foot brake has not been operated, and then executes the parking process.

In claim 2, it is configured such that, the predetermined parking condition includes that an opening of a door of the vehicle has been detected.

In claim 3, it is configured such that, the predetermined parking condition includes that the driver is on board the vehicle.

In claim 4, it is configured such that, the parking mechanism control means executes the travel speed control when it is determined that the driver is on board, while controlling the operation of the automatic braking system to make the vehicle travel speed zero when it is determined that the driver is not on board.

In claim 5, it is configured such that, the parking mechanism is a mechanism that establishes the locked state by putting a parking pole in locking engagement with the parking gear, and the set speed is defined as a speed enabling engagement of the parking gear and the parking pole.

Effects of the Invention

In claim 1, it is configured to have an apparatus for controlling parking of a vehicle having a shift-by-wire type parking mechanism, a foot brake, an automatic braking system, a stop detection means, a road surface gradient detection means and a vehicle travel speed detection means, wherein at a time of causing a parking mechanism to execute parking process to switch the parking gear to the locked state when a predetermined parking condition is established and a detected road surface gradient is equal to or greater than a predetermined value, it is determined whether the foot brake has been operated, a travel speed control is executed for controlling operation of the automatic braking system to make the travel speed of the vehicle greater than zero but equal to or less than the set speed, if it is determined that the foot brake has not been operated, and the parking process is then executed, so that when the vehicle is parked on a road surface whose gradient is equal to or greater than the predetermined value, establishment of the locked state of the parking mechanism is facilitated during the parking process and the driver can be prompted to operate the foot brake (brake pedal) and the parking brake.

To explain further, by defining the set speed as, for example, a very low speed at which the parking gear and the parking pole can engage, it becomes possible to engage the parking pole with the parking gear even if the vehicle should creep during parking on a road surface of a gradient equal to or greater than the predetermined value, thereby making it easy to establish the locked state of the parking mechanism during the parking process.

Moreover, when the foot brake is determined not to have been operated by the driver, travel speed control is executed to control the operation of the automatic braking system to make the travel speed of the vehicle greater than zero but equal to or less than the set speed, in other words so as not to stop the vehicle. As a result, a driver who intends to leave the vehicle can be prompted to operate the parking brake, while operating the foot brake.

In addition, it is possible to extend the service life of the parking mechanism and, since the driver conducts the braking operation by himself/herself, to save the driver from feeling a jolt owing to sudden locking.

In claim 2, it is configured such that, the predetermined parking condition includes that an opening of a door of the vehicle has been detected, so that situations in which the driver is prompted to perform a brake operation can again be limited to the minimum necessary range.

In claim 3, it is configured such that, the predetermined parking condition includes that the driver is on board the vehicle, so that situations in which the driver is prompted to perform a brake operation can similarly be limited to the minimum necessary range.

In claim 4, it is configured such that, the parking mechanism control means executes the travel speed control when it is determined that the driver is on board, while controlling the operation of the automatic braking system to make the vehicle travel speed zero when it is determined that the driver is not on board, so that, in addition to the aforesaid effects, situations in which the driver is prompted to perform a brake operation can be more thoroughly limited to the minimum necessary range and the vehicle can be safely stopped when the driver is not on board prior to execution of the parking process (the predetermined condition is not met).

In claim 5, it is configured such that, the parking mechanism is a mechanism that establishes the locked state by putting a parking pole in locking engagement with the parking gear, and the set speed is defined as a speed enabling engagement of the parking gear and the parking pole, so that, in addition to the aforesaid effects, it is possible to reliably engage the parking pole 70b with the parking gear even if the vehicle creeps during parking on a road surface of a gradient equal to or greater than the predetermined value, so that it becomes even easier to establish the locked state of the parking mechanism during the parking process.

DESCRIPTION OF EMBODIMENTS

Embodiments for implementing the vehicle parking control apparatus according to this invention are explained with reference to the attached drawings in the following.

Embodiment 1

Figure 1:
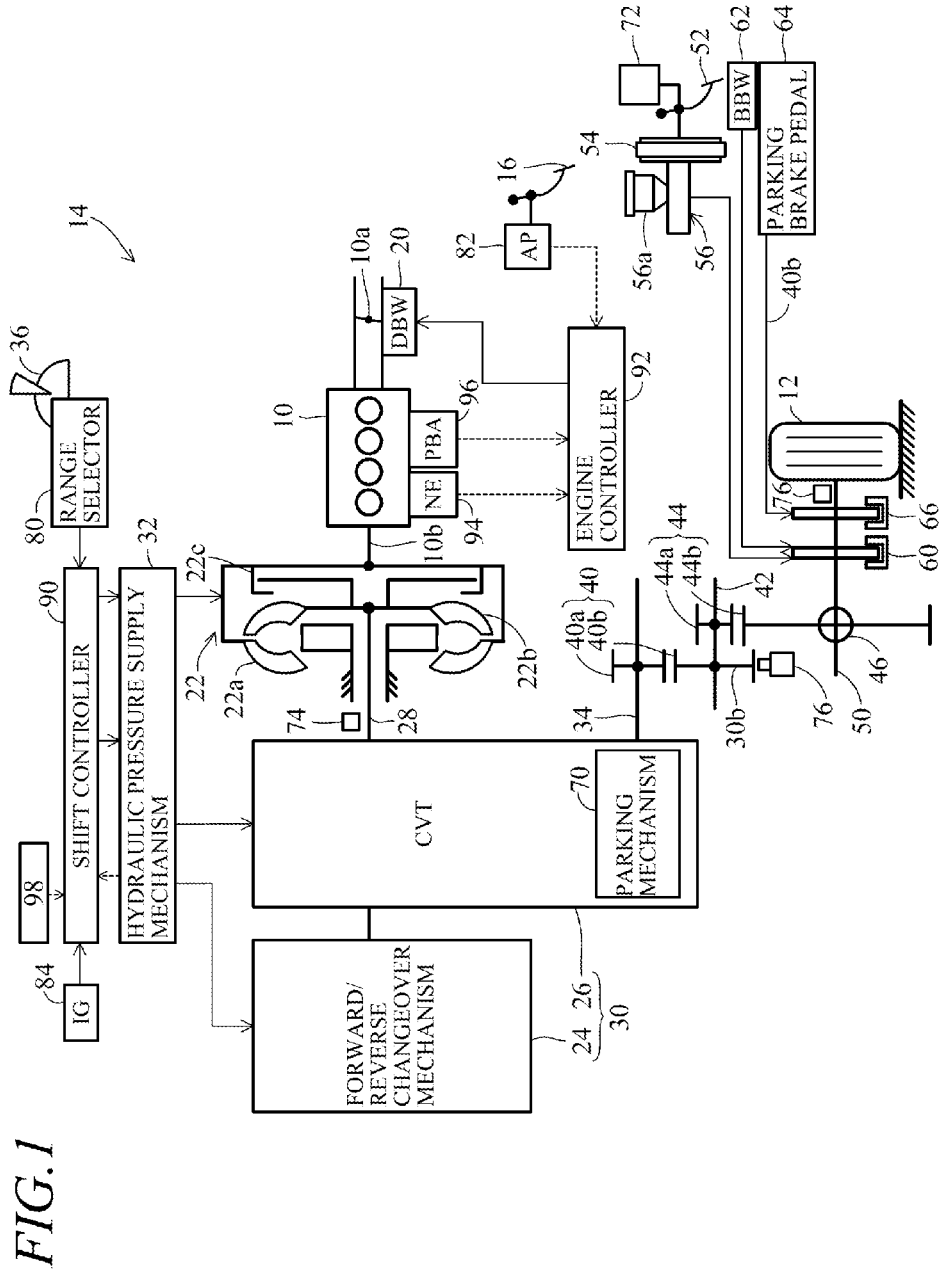
FIG. 1 is an overall schematic view of a vehicle parking control apparatus according to a first embodiment of this invention.
Figure 2:
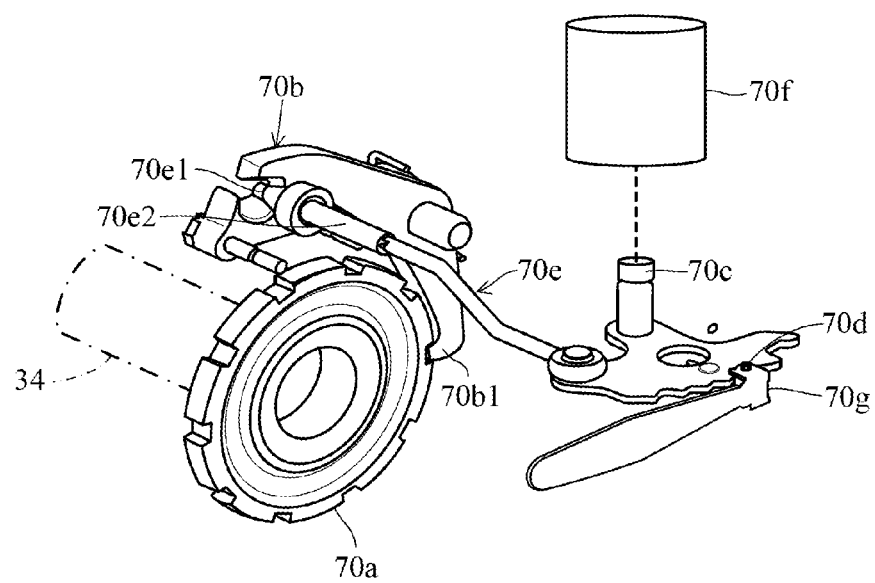
FIG. 2 is an explanatory view showing a realistic representation of the parking mechanism shown in FIG. 1.

FIG. 1 is an overall schematic view of a vehicle parking control apparatus according to a first embodiment of this invention, and FIG. 2 is an explanatory view showing a realistic representation of the parking mechanism shown in FIG. 1.

Reference numeral 10 in FIG. 1 designates an engine (power source). The engine 10 is a four-cylinder, gasoline-fueled, internal combustion engine that is installed in a vehicle 14 equipped with driven wheels (vehicle wheels) 12 (the vehicle 14 is depicted partially by representative components including the engine 10 and driven wheels 12).

A throttle valve 10a installed in an air-intake system of the engine 10 is mechanically disconnected from an accelerator pedal 16 installed on the floor at a vehicle operator's seat and is connected to and opened/closed by a DBW (Drive By Wire) mechanism 20 comprising an electric motor or other actuator.

Intake air metered by the throttle valve 10a flows through an intake manifold (not shown) to be mixed with fuel injected from injectors (not shown) located near intake ports of respective cylinders to form an air-fuel mixture that flows into the cylinder combustion chambers (not shown) when intake valves (not shown) open. In each combustion chamber, the fuel mixture is ignited and burns, thereby driving a piston and rotating a crankshaft (not shown), whereafter it is discharged out of the engine 10 as exhaust.

The rotation of the engine 10 is transmitted through an output shaft 10b connected to the crankshaft and inputted to a torque converter 22 and further from the torque converter 22 through a forward/reverse changeover mechanism 24 to a CVT (Continuously Variable Transmission) 26.

Specifically, the output shaft 10b of the engine 10 is connected to a pump impeller 22a of the torque converter 22, while a turbine-runner 22b installed opposite thereto to receive a fluid (hydraulic oil) is connected to a transmission input shaft 28. The pump impeller 22a and the turbine-runner 22b are directly connected when a lock-up clutch 22c is engaged (turned ON).

Although omitted from the drawings, the forward/reverse changeover mechanism 24 is equipped with a planetary gear mechanism, a forward clutch, and a reverse brake-clutch.

In this embodiment, an automatic transmission (designated by reference numeral 30) comprises the forward/reverse changeover mechanism 24 and the CVT 26. The automatic transmission 30 is equipped with a hydraulic pressure supply mechanism 32 that supplies hydraulic pressure to the lock-up clutch 22c of the torque converter 22, the clutch of the forward/reverse changeover mechanism 24, and the CVT 26. The hydraulic pressure supply mechanism 32 is equipped with, inter alia, the oil pump (oil feed pump) driven by the engine 10 to pump hydraulic oil from a reservoir and deliver it to oil passages, and a group of electromagnetic solenoid valves interposed in the oil passages, and other components.

Although not illustrated in the drawings, the CVT 26 comprises a drive pulley installed on a peripheral shaft of the transmission input shaft, a driven pulley installed on a peripheral shaft of a transmission output shaft 34 deployed in parallel with the transmission input shaft 28, and a power transmission element constituted as an endless flexible member (e.g., a metal belt) wound around the drive and driven pulleys.

A range selector 36 including P, R, N and D ranges, for example, is provided at the vehicle operator's seat to be operable by the driver. The range selected by the driver using the range selector 36 is sent to a shift control (explained later) as an electric signal.

When the D range is selected, the shift controller controls a linear solenoid and an electromagnetic solenoid valve of the hydraulic pressure supply mechanism 32 to supply hydraulic pressure to and engage the forward clutch of the forward/reverse changeover mechanism 24, thereby converting the rotation of the transmission input shaft 28 into rotation corresponding to the forward direction of the vehicle 14, while when the R range is selected, the hydraulic pressure supply mechanism 32 is operated to supply hydraulic pressure to and engage the reverse brake-clutch, thereby converting the rotation of the transmission input shaft 28 into rotation corresponding to the reverse direction of the vehicle 14.

The rotation of the transmission input shaft 28 is inputted to the CVT 26. The CVT 26 varies the pulley width of the drive pulley and driven pulley in accordance with the hydraulic pressure supplied from the hydraulic pressure supply mechanism 32, thereby varying the belt winding radius to regulate the rotation (rotary drive force) of the engine 10 to a desired ratio (transmission ratio) for output to the transmission output shaft 34.

When the range selector 36 is set to P or N range, the forward clutch and reverse brake-clutch are released, so that transmission of power through the forward/reverse changeover mechanism 24 is cut off and transmission of power between the engine 10 and the drive pulley of the CVT 26 is interrupted.

The rotation of the transmission output shaft 34 is transmitted to an intermediate shaft 42 through gears 40 (drive gear 40a and driven gear 40b), is thereafter transmitted to a differential mechanism 46 through gears 44 (drive gear 44a and driven gear 44b), and is further transmitted to the driven wheels 12 through drive shafts 50.

A brake pedal (foot brake) 52 is deployed on the floor at the vehicle operator's seat to be operable by the driver. The brake pedal 52 is connected through a brake booster 54 and a master cylinder 56 to disc brakes 60. The master cylinder 56 is equipped with a reservoir 56a for storing brake fluid and a piston (not shown) slidable in an oil chamber filled with brake fluid from the reservoir 56a. When the driver steps down on the brake pedal 52, the force of the depression is amplified by the brake booster 54 and sent to the master cylinder 56.

The stroke length of the piston of the master cylinder 56 is proportional to the amplified pedal depression force. The fluid pressure produced by the piston stroke is applied to the disc brakes 60 of the driven wheels 12 to operate the disc brakes 60 and brake (decelerate) the vehicle 14.

In addition to being connected to the brake pedal (foot brake) 52, the disc brakes 60 are also connected to a BBW (Brake-By-Wire) mechanism (automatic braking system) 62 and operate to brake the vehicle 14 upon receiving brake fluid pressure from the BBW mechanism 62.

Moreover, a parking brake pedal 64 is installed near the brake pedal 52 on the floor at the vehicle operator's seat, and drum brakes 66 are installed near the disc brakes 60. The parking brake pedal 64 is connected to the drum brakes 66 through a suitable booster mechanism and operation of the parking brake pedal 64 by the driver decelerates the vehicle 14.

The automatic transmission 30 is equipped with a parking mechanism 70.

FIG. 2 is an explanatory view showing a realistic representation of the parking mechanism 70.

As illustrated, the parking mechanism 70 is of a known structure comprising a parking gear 70a fastened to the transmission output shaft 34, a parking pole 70b swingably fastened near a gear of the parking gear 70a, a detent lever 70d whose one end is formed with multiple detent indentations and other end is swingably connected to a control shaft 70c, a cone lever 70e whose one end is connected to the detent lever 70d and other end is provided with a cone 70e1, an actuator (electric motor) 70f connected to the control shaft 70c, and a detent spring 70g that engages and holds a detent indentation of the detent lever 70d.

The parking pole 70b is provided at one end with a pole member 70b1 capable of locking engagement with the gear of the parking gear 70a and configured at another end to be abuttable on the cone 70e1 of the cone lever 70e. The cone lever 70e is equipped with a spring 70e2 that urges the cone 70e1 toward the parking pole 70b.

In the parking mechanism 70, the detent lever 70d is moved forward or backward relative to the parking pole 70b in accordance with the rotation of the actuator 70f. More specifically, when the detent lever 70d is moved forward, the parking mechanism 70 is rotated in the direction that moves the parking pole 70b away from the parking gear 70a, whereby the pole member 70b1 provided on the other end is locked in engagement with the gear of the parking gear 70a to stop rotation of the transmission output shaft 34.

Returning to the explanation of FIG. 1, a brake switch 72 associated with the brake pedal 52 outputs an ON signal every time the driver operates the brake pedal 52, and an NT sensor (rotational speed sensor) 74 installed near the transmission input shaft 28 utilizes the rotational speed of the turbine-runner 22b to output a pulse signal indicating the rotational speed of the transmission input shaft 28.

An NDR sensor (rotational speed sensor; not shown) installed near the drive pulley of the CVT 26 outputs a pulse signal corresponding to the drive pulley rotational speed NDR, and an NDN sensor (rotational speed sensor; not shown) installed at a suitable location near the driven pulley outputs a pulse signal indicating the rotational speed NDN of the driven pulley, namely the rotational speed of the transmission output shaft 34.

Wheel speed sensors 76 installed one near each of four wheels, i.e., the two driven wheels 12 plus two free wheels, utilize rotational speeds of the wheels to output pulse signals proportional to the vehicle speed (travel speed of the vehicle 14), and a range selector switch 80 installed near the range selector 36 outputs a signal corresponding to the range P, R, N, D or the like selected by the driver. An accelerator position sensor 82 installed near the accelerator pedal 16 outputs a signal corresponding to the depression of the accelerator pedal 16 by the driver.

In addition, an ignition switch 84 installed near a dashboard of the vehicle 14 responds to operation of an ignition key by the driver by applying electric current to an ignition circuit and the like.

Although omitted from the drawings, the vehicle 14 is also equipped with door switches that output an ON signal when the associated door is opened. Further, seat belt sensors are installed that output an ON signal if the associated seat belt buckle is not fastened when the ignition switch 84 is turned ON.

The outputs of the NT sensor 74 and other sensors are sent to the aforesaid shift controller (designated by reference numeral 90). The shift controller 90 comprises an electronic control unit equipped with a microcomputer including a CPU, ROM, RAM, I/O and other components.

In addition, an engine controller 92, also comprising an electronic control unit, is provided for controlling the operation of the engine 10. The engine controller 92, which is equipped with a crank angle sensor 94, an manifold absolute pressure sensor 96 and other sensors not shown in the drawings, controls the operation of the engine 10 based on engine speed NE detected by the crank angle sensor 94, engine load PBA detected by the manifold absolute pressure sensor 96, and outputs of the other sensors. The engine controller 92 is housed in a case and mounted near the dashboard of the vehicle 14.

The shift controller 90 is communicably connected to the engine controller 92, and is housed in a case and mounted horizontally near the dashboard of the vehicle 14.

A slope sensor 98 is located inside the case that houses the shift controller 90 and its output is also inputted to the shift controller 90. The slope sensor 98 has a pendulum, detects its offset from the vertical axis, and produces an output proportional to the gradient (slope) of the road surface at the location of the vehicle 14.

The shift controller 90 controls the operation of the torque converter 22, the forward/reverse changeover mechanism 24 and the CVT 26 by energizing/de-energizing the electromagnetic solenoids of the hydraulic pressure supply mechanism 32 based on the outputs of the NT sensor 74 and other sensors, and controls parking of the vehicle 14 by controlling the operation of the actuator 70f of the parking mechanism 70.

Figure 3:
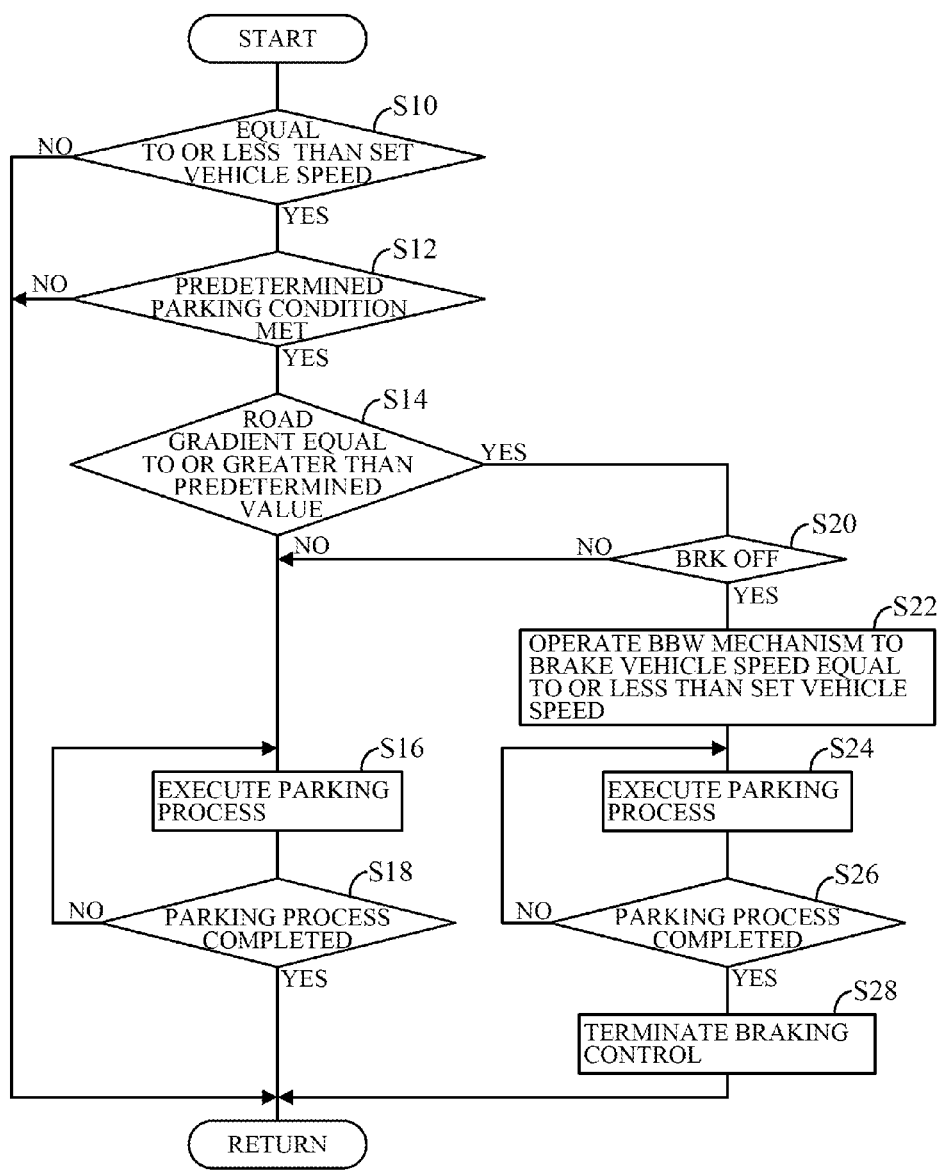
FIG. 3 is a flowchart showing the operation of the apparatus shown in FIG. 1.
Figure 4:
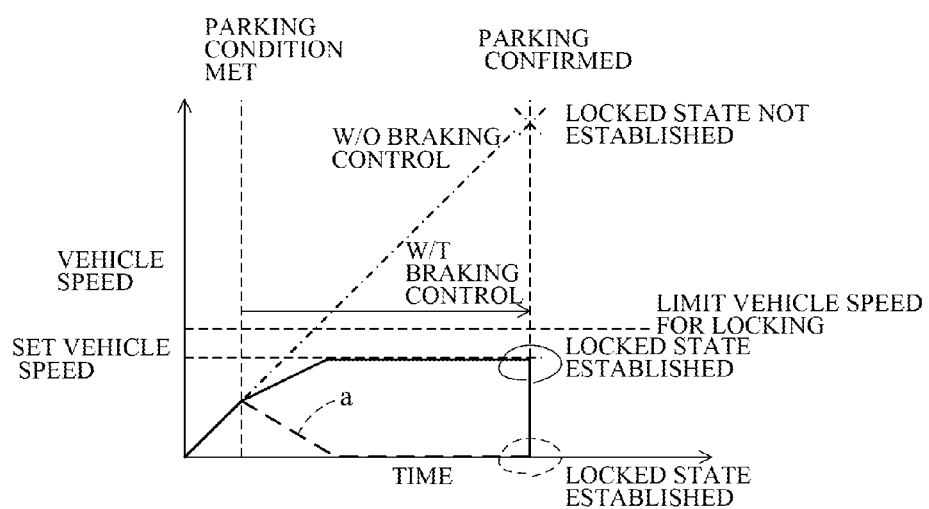
FIG. 4 is a timing chart for explaining the operation according to the flowchart of FIG. 3.

FIG. 3 is a flowchart showing the operation of the shift controller (operating as the vehicle parking control apparatus) 90, and FIG. 4 is a timing chart of the processing in FIG. 3.

Now to explain, the program begins at S10, in which it is determined whether the vehicle speed detected from the wheel speed sensors 76 (travel speed of the vehicle 14) is equal to or less than a set vehicle speed (set speed) ensuring that the vehicle 14 can be stopped.

The parking mechanism 70 is configured to switch the parking gear 70a to a non-rotatable state by putting the pole member 70b1 of the parking pole 70b in locking engagement with the parking gear 70a (or to switch the parking gear 70a to a rotatable unlocked state by releasing the engagement of the parking gear 70a and the pole member 70b1).

Since switching to the locked state becomes increasingly difficult as the vehicle speed determining the rotation of the transmission output shaft 34 increases, there is a limit on the vehicle speed allowing establishment of the locked state (limit vehicle speed for locking). As shown in FIG. 4, the set vehicle speed is set to a value less than the limit vehicle speed for locking. For example, if the limit vehicle speed for locking is 10 km/h, the set vehicle speed is defined as a few km/h.

When the result in S10 is negative, parking control is not required, so the ensuing processing steps are skipped, and when it is affirmative, the program proceeds to S12, in which it is determined whether a predetermined parking condition is met.

The predetermined parking condition here is, for example, that the driver has set the range selector 36 to P range or has turned the ignition switch 84 OFF.

When the result in S12 is negative, parking control is not required, so the ensuing processing steps are skipped, and when it is affirmative, the program proceeds to S14, in which it is determined whether the gradient (slope) of the road surface at the current location of the vehicle 14 detected by the slope sensor 98 is equal to or greater than a predetermined value.

The predetermined value is a value corresponding to a gentle gradient. More specifically, the predetermined value is empirically determined by using the creep speed of the vehicle 14 at various gradients when the driver has not operated the brake pedal (foot brake) 52 or the parking brake pedal 64 and the response time of the actuator 70f of the parking mechanism 70 to calculate a gradient at which the creep speed does not exceed the set vehicle speed.

When the result in S14 is negative, i.e., when the road surface where the vehicle 14 is currently located is found to be flat or gently sloped, there is no risk of the creep speed exceeding the set vehicle speed, so the program proceeds to S16 to execute the parking process.

The parking process means the process of establishing the locked state (immobilizing the transmission output shaft 34) by operating the actuator 70f of the parking mechanism 70 to put the pole member 70b1 of the parking pole 70b in locking engagement with the gear of the parking gear 70a.

The program next proceeds to S18, in which it is determined whether the parking process has been completed. This is determined, for example, from a position signal of the actuator 70f of the parking mechanism 70. When the result in S18 is negative, the program returns to S16, in which the foregoing processing is repeated, and when it is affirmative, the program terminates the processing.

On the other hand, when the result in S14 is affirmative, i.e. when the gradient of the road surface at the current location is found to be equal to or greater than the predetermine value, the program proceeds to S20, in which a BRK OFF determination is made, i.e. it is determined whether operation of the brake pedal 52 has not been detected from the brake switch 72, which amounts to determining whether or not the driver has indicated an intention to stop.

When the result in S20 is negative, the program proceeds to S16, and when it is affirmative, proceeds to S22, in which the BBW mechanism (automatic braking system) 62 is operated to brake the vehicle 14 to a travel speed greater than zero but equal to or less than the set vehicle speed.

Next, the program proceeds to S24 and S26, in which, independently of any brake operation by the driver via the brake pedal (foot brake) 52, the parking process is executed by operating the BBW mechanism (automatic braking system) 62 to stop the vehicle 14 and thereafter establish the locked state (immobilize the transmission output shaft 34) by operating the actuator 70f of the parking mechanism 70 to put the pole member 70b1 of the parking pole 70b in locking engagement with the parking gear 70a. Next, processing like that explained regarding S18 is performed, whereafter the program proceeds to S28, in which braking control is terminated, i.e., operation of the BBW mechanism (automatic braking system) 62 is terminated.

Owing to the aforesaid configuration of this embodiment, it is possible during the process of parking the vehicle 14 on a road surface whose gradient is equal to or greater than a predetermined value to facilitate establishment of the locked state of the parking mechanism 70 during the parking process and to prompt the driver to operate the foot brake (brake pedal) 52 and the parking brake pedal 64.

To explain in more detail with reference to FIG. 4, say, for example, that the limit vehicle speed for locking is 10 km/h and the set vehicle speed is defined as a slower speed of a few km/h, i.e., as a very low speed at which the pole member 70b1 of the parking pole 70b and the gear of the parking gear 70a can engage. It then becomes possible to engage the pole member 70b1 of the parking pole 70b with the gear of the parking gear 70a even if the vehicle 14 should creep during parking on a road surface of a gradient equal to or greater than the predetermined value, thereby making it easy to establish the locked state of the parking mechanism 70 during the parking process. As indicated by the imaginary line (dashed-dotted line) in FIG. 4, the locked state is not established when no vehicle braking is performed.

The case of the prior art (Patent Reference 1) is indicated by a broken line a in FIG. 4. In the prior art, when the parking mechanism is to be put in the locked state, the vehicle is stopped by putting its driven wheels in a non-rotating condition, so there is a risk of the driver taking his or her foot off the foot brake (brake pedal) before the parking mechanism establishes the locked state and also forgetting to operate the parking brake before leaving the vehicle.

However, this embodiment is configured so that when the foot brake (brake pedal) 52 is determined not to have been operated by the driver, travel speed control is executed to control the operation of the automatic braking system to make the travel speed of the vehicle 14 greater than zero but equal to or less than the set vehicle speed, in other words so as not to stop the vehicle 14. As a result, a driver who intends to leave the vehicle 14 can be cautioned and prompted to operate the parking brake 64 until locking has been established, while operating the foot brake (brake pedal) 52.

In addition, it is possible to extend the service life of the parking mechanism 70 and, since the driver conducts the braking operation by himself/herself, to save the driver from feeling a jolt owing to sudden locking.

Moreover, situations in which the driver is prompted to perform a brake operation can be minimized because the configuration defines the predetermined parking condition to be that the driver has set the range selector 36 to P range or has turned the ignition switch 84 OFF.

Further, in the vehicle parking control apparatus, a configuration is adopted in which the parking mechanism 70 is a mechanism that establishes the locked state by putting a parking pole 70b in locking engagement with the parking gear 70a and in which the set vehicle speed (set speed) is defined as a speed enabling engagement of the parking gear 70a and the parking pole 70b, whereby, in addition to the aforesaid effects, it is possible to reliably engage the parking pole 70b with the parking gear 70a even if the vehicle 14 creep during parking on a road surface of a gradient equal to or greater than the predetermined value, so that it becomes even easier to establish the locked state of the parking mechanism 70 during the parking process.

Embodiment 2

Figure 5:
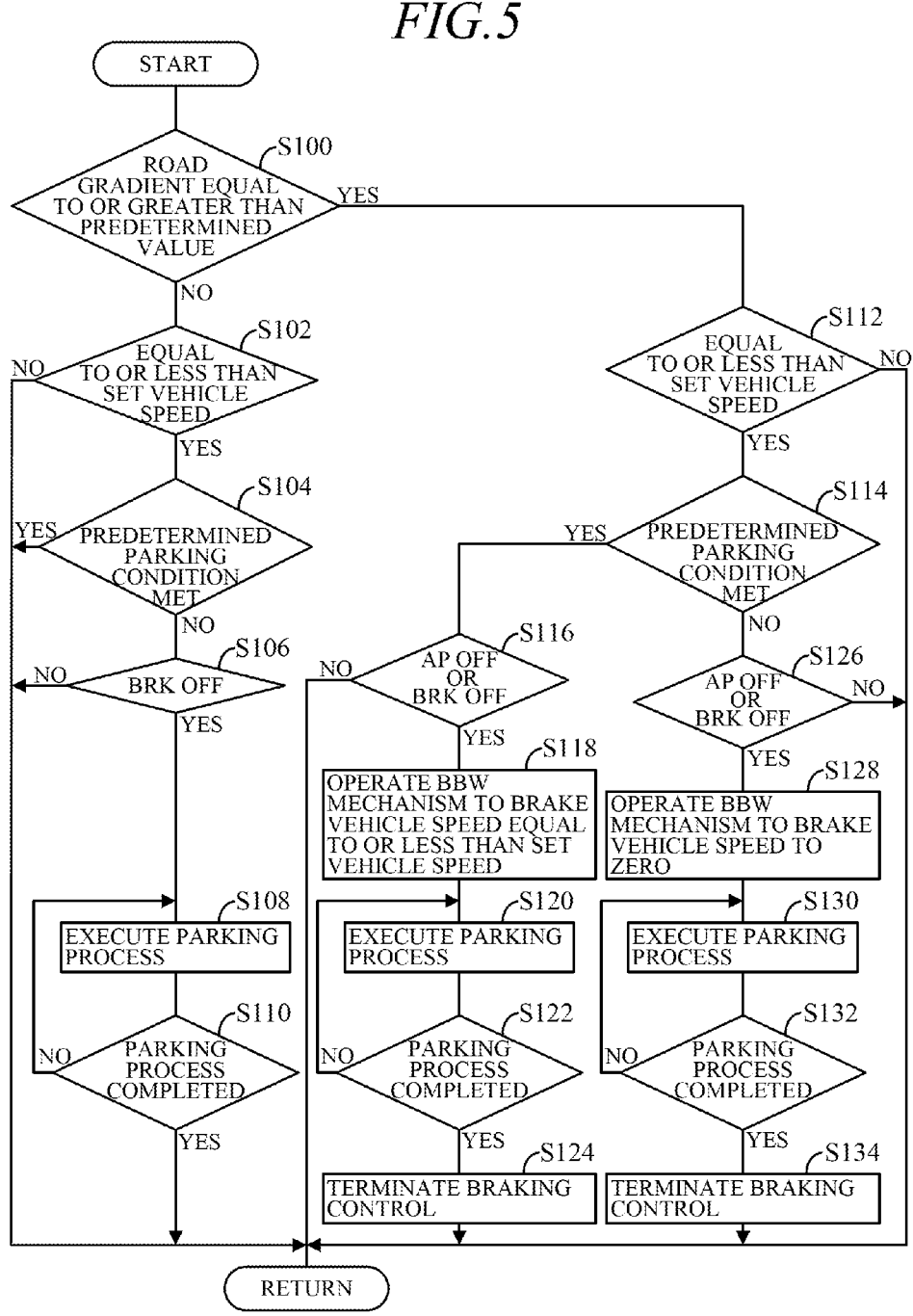
FIG. 5 is a flowchart showing the operation of a vehicle parking control apparatus according to a second embodiment of this invention.
Figure 6:
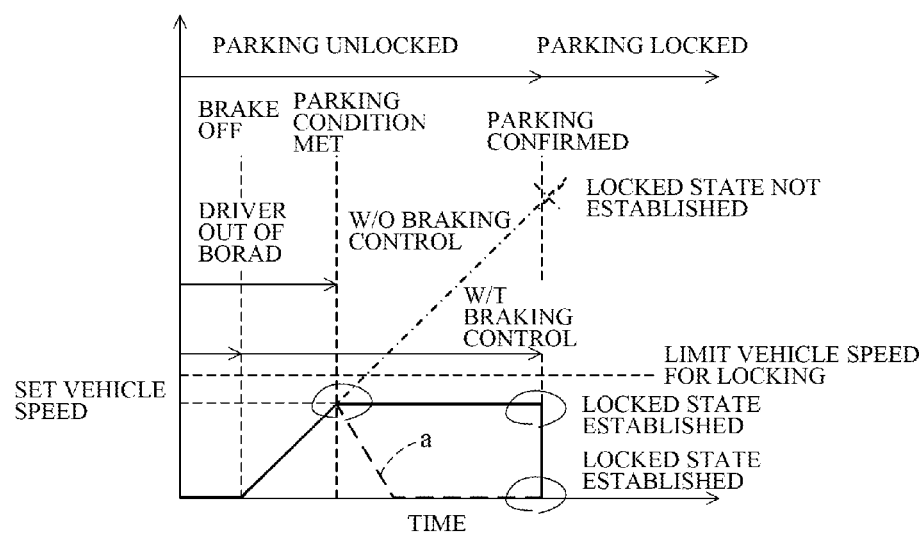
FIG. 6 is a timing chart for explaining the operation according to the flowchart of FIG. 5.

FIG. 5 is a flowchart showing the operation of a vehicle parking control apparatus according to a second embodiment of this invention, specifically, the operation of the shift controller 90. FIG. 6 is a timing chart of the processing of FIG. 5.

Now to explain, the program begins at S100, in which it is determined whether the gradient (slope) of the road surface at the current location of the vehicle 14 detected by the slope sensor 98 is equal to or greater than the predetermined value. When the result in S100 is negative, i.e., when the road surface where the vehicle 14 is currently located is found to be flat or gently sloped, the program proceeds to S102, in which it is determined whether the vehicle speed detected from the wheel speed sensors 76 is equal to or less than the aforesaid speed at which the vehicle 14 can be stopped.

When the result in S102 is negative, parking control is not required, so the ensuing processing steps are skipped, and when it is affirmative, the program proceeds to S104, in which it is determined whether a predetermined parking condition is met.

While the predetermined parking condition in the first embodiment is that the driver has set the range selector 36 to P range or has turned the ignition switch 84 OFF, in the second embodiment it is instead that at least the opening of a door of the vehicle 14 has been detected, more exactly that the opening of a door of the vehicle 14 has been detected and the driver is on board the vehicle 14.

Whether or not the driver is on board is determined comprehensively from the open/closed state of a door of the vehicle 14 detected by a door switch and the buckled/unbuckled state of a seat belt detected by a seat belt sensor. It is also possible to provide the seat with a seat occupancy sensor and include its detection value in the comprehensive determination.

When the result in S104 is affirmative, parking control is not required, so the ensuing processing steps are skipped, and when it is negative, the program proceeds to S106, in which a BRK OFF determination is made, i.e. it is determined whether operation of the brake pedal 52 has not been detected from the brake switch 72.

When the result in S106 is negative, the driver is determined to be operating the brake pedal 52 and the ensuing processing steps are skipped so as not to prevent the driver's operation, and when it is affirmative, suggesting that the driver may not be on board and that the vehicle 14 needs to be stopped, the program proceeds to S108, in which the aforesaid parking process is executed, and then to S110, in which it is determined whether the parking process has been completed. When the result in S110 is negative, the program returns to S108 to repeat the aforesaid processing, and when it is affirmative, the program terminates the processing.

On the other hand, when the result in S100 is affirmative, i.e., when gradient (slope) of the road surface where the vehicle 14 is currently located is found to be equal to or greater than the aforesaid predetermined value, the program proceeds to S112, in which it is again determined whether the vehicle speed detected from the wheel speed sensors 76 is equal to or less than the aforesaid set vehicle speed.

When the result in S112 is negative, parking control is not required, so the ensuing processing steps are skipped, and when it is affirmative, the program proceeds to S114, in which processing like that explained regarding S104 is performed to determine again whether the aforesaid predetermined parking condition is met.

When the result in S114 is affirmative, i.e., when the predetermined parking condition is found to have been met, the program proceeds to S116, in which an AP OFF (accelerator pedal is fully released) or BRK OFF (the brake pedal 52 is not operated) determination is made.

When the result in S116 is negative, the accelerator operation, for example, is being conducted and parking control is not required, so the ensuing processing steps are skipped, and when it is affirmative, the program proceeds to S118, in which the BBW mechanism (automatic braking system) 62 is operated to brake the vehicle 14 to a travel speed greater than zero but equal to or less than the set vehicle speed.

Next, the program proceeds to S120 and S122, to perform the same processing as explained regarding S108 and S110, whereafter the program proceeds to S124, in which braking control is terminated, i.e., operation of the BBW mechanism (automatic braking system) 62 is terminated.

On the other hand, when the result in S114 is negative, i.e., when it is found that the predetermined parking condition is not met (driver not on board), the program proceeds to S126, in which it is determined whether AP OFF (accelerator is pedal fully released) and also BRK OFF (the brake pedal 52 is not operated), i.e., it is determined whether operation of the brake pedal 52 has not been detected from the brake switch 72.

When the result in S126 is negative, suggesting that the driver may actually be on board and operating the brake pedal 52, for example, the ensuing processing steps are skipped so as not to prevent the driver's operation, and when it is affirmative, which suggests that the driver may not be on board, the program proceeds to S128, in which the BBW mechanism (automatic braking system) 62 is operated to stop the vehicle 14 by braking it to a travel speed of zero.

Next, the program proceeds to S130 and S132, to perform the same processing as explained regarding S108 and S110, whereafter the program proceeds to S134, in which braking control is terminated, i.e., operation of the BBW mechanism (automatic braking system) 62 is terminated.

Owing to the aforesaid configuration of the second embodiment, it is possible during the process of parking the vehicle 14 on a road surface whose gradient is equal to or greater than a predetermined value to facilitate establishment of the locked state of the parking mechanism 70 during the parking process and to prompt the driver to operate the foot brake and the parking brake.

To explain in more detail with reference to FIG. 6, say, for example, that the limit vehicle speed for locking is 10 km/h and the set vehicle speed is defined as a slower speed of a few km/h, i.e., as a very low speed at which the pole member 70b1 of the parking pole 70b and the gear of the parking gear 70a can engage. It then becomes possible to engage the pole member 70b1 of the parking pole 70b with the gear of the parking gear 70a even if the vehicle 14 should creep during parking on a road surface of a gradient equal to or greater than the predetermined value, thereby making it easy to establish the locked state of the parking mechanism 70 during the parking process.

Moreover, a configuration is adopted in which the predetermined parking condition is that at least the opening of a door of the vehicle 14 has been detected, more exactly that the opening of a door of the vehicle 14 has been detected and the driver is on board the vehicle 14, whereby situations in which the driver is prompted to perform a brake operation can again be limited to the minimum necessary range.

Further, a configuration is adopted in which, when the driver is determined to be on board the vehicle 14, travel speed control is executed, while when the driver is found not to be on board the vehicle 14, the operation of the BBW mechanism (automatic braking system) 62 is controlled to make the vehicle travel speed zero, so that, in addition to the aforesaid effects, the vehicle 14 can be safely stopped.

In the remaining aspects, the configuration and effects are no different from those of the first embodiment.

As described in the foregoing, the first and second embodiments are configured to have an apparatus (shift controller) 90 for controlling parking of a vehicle 14 having: an automatic transmission 30 connected to a power source (engine) 10 mounted in the vehicle to change speed of rotation of the power source inputted to an input shaft (transmission input shaft) 28 and transmit from an output shaft (transmission output shaft) 34 to the driven wheels 12; a shift-by-wire type parking mechanism 70 that enables a parking gear 70a connected to the output shaft 34 of the automatic transmission 30 to be switched between a rotatable unlocked state and an non-rotatable locked state; a foot brake (brake pedal) 52 that enables braking of the vehicle 14 in response to brake pedal operation by a driver; an automatic braking system (BBW mechanism) 62 that enables braking of the vehicle 14 independently of the aforesaid brake pedal operation; a stop detection means (wheel speed sensors 76) adapted to detect stopping of the vehicle 14; a road surface gradient detection means (slope sensor 98) adapted to detect a gradient of a road surface where the vehicle 14 is located; and a vehicle travel speed detection means (wheel speed sensors 76) adapted to detect a travel speed of the vehicle, wherein the improvement comprises: a parking mechanism control means (parking mechanism controller; S10 to S28, S100 to S134) adapted to cause the parking mechanism to execute parking process to switch the parking gear to the locked state when a predetermined parking condition is established and the detected road surface gradient is equal to or greater than a predetermined value; wherein the parking mechanism control means determines whether the foot brake has been operated (S20, S116) when causing the parking mechanism to execute the parking process, executes a travel speed control (S22, S118) for controlling operation of the automatic braking system to make the travel speed of the vehicle 14 greater than zero but equal to or less than the set speed (set vehicle speed) (0<Vehicle speed≤Set vehicle speed), if it is determined that the foot brake has not been operated, and then executes the parking process (S24 to S28, S120 to S124), so that when the vehicle 14 is parked on a road surface whose gradient is equal to or greater than the predetermined value, establishment of the locked state of the parking mechanism 70 is facilitated during the parking process and the driver can be prompted to operate the foot brake (brake pedal) 52 and the parking brake 64.

To explain further, by defining the set speed as, for example, a very low speed at which the parking gear 70a and the parking pole 70b can engage, it becomes possible to engage the parking pole 70b with the parking gear 70a even if the vehicle 14 should creep during parking on a road surface of a gradient equal to or greater than the predetermined value, thereby making it easy to establish the locked state of the parking mechanism 70 during the parking process.

Moreover, when the foot brake (brake pedal) 52 is determined not to have been operated by the driver, travel speed control is executed to control the operation of the automatic braking system (BBW mechanism) 62 to make the travel speed of the vehicle 14 greater than zero but equal to or less than the set speed (set vehicle speed), in other words so as not to stop the vehicle 14. As a result, a driver who intends to leave the vehicle 14 can be prompted to operate the parking brake 64, while operating the foot brake (brake pedal) 52.

In the vehicle parking control apparatus according to the first embodiment is configured such that, the predetermined parking condition includes that the driver has set the range selector 36 to P range or has turned the ignition switch 84 OFF, whereby situations in which the driver is prompted to perform a brake operation can be limited to the minimum necessary range.

In the vehicle parking control apparatus according to the second embodiment is configured such that, the predetermined parking condition includes that the opening of a door of the vehicle 14 has been detected, more exactly that the opening of a door of the vehicle 14 has been detected and the driver is on board the vehicle 14, whereby situations in which the driver is prompted to perform a brake operation can again be limited to the minimum necessary range.

Moreover, in the vehicle parking control apparatus according to the second embodiment is configured such that, the parking mechanism control means executes the travel speed control when it is determined that the driver is on board (S114, S116, S118), while controlling the operation of the automatic braking system (BBW mechanism) 62 to make the vehicle travel speed zero when it is determined that the driver is not on board (S126, S128), so that, in addition to the aforesaid effects, situations in which the driver is prompted to perform a brake operation can be more thoroughly limited to the minimum necessary range and the vehicle can be safely stopped when the driver is not on board prior to execution of the parking process (the predetermined condition is not met).

In the vehicle parking control apparatus according to the first and second embodiments are configured such that, the parking mechanism 70 is a mechanism that establishes the locked state by putting a parking pole 70b in locking engagement with the parking gear 70a and in which the set speed (set vehicle speed) is defined as a speed enabling engagement of the parking gear 70a and the parking pole 70b, whereby, in addition to the aforesaid effects, it is possible to reliably engage the parking pole 70b with the parking gear 70a even if the vehicle 14 creeps during parking on a road surface of a gradient equal to or greater than the predetermined value, so that it becomes even easier to establish the locked state of the parking mechanism 70 during the parking process.

Although the power source was exemplified by an engine (internal combustion engine) in the foregoing description, it can instead by an electric motor or a hybrid of an engine and an electric motor. Moreover, the automatic transmission is not limited to a CVT but can instead be a dual-clutch or stepped transmission.

Although the road surface gradient is detected with a slope sensor in the embodiments, it can instead be calculated as set out in Japanese Patent No. 4167124.

INDUSTRIAL APPLICABILITY

According to the invention, since it is configured such that, at a time of causing a parking mechanism to execute parking process to switch a parking gear to a locked state when a predetermined parking condition is established and a detected road surface gradient is equal to or greater than a predetermined value, it is determined whether a foot brake has been operated, operation of an automatic braking system is controlled to make a travel speed of the vehicle greater than zero but equal to or less than a set speed if it is determined that the foot brake has not been operated, and the parking process is then executed, when a vehicle is parked on a road surface whose gradient is equal to or greater than the predetermined value, establishment of the locked state of the parking mechanism is facilitated during the parking process and the driver can be prompted to operate the foot brake and the parking brake.

DESCRIPTION OF SYMBOLS 10 engine (internal combustion engine; power source), 12 driven wheel, 14 vehicle, 16 accelerator pedal, 20 DBW mechanism, 22 torque converter, 24 forward/reverse changeover mechanism (automatic transmission), 26 continuously variable transmission (CVT; automatic transmission), 28 transmission input shaft, 30 automatic transmission, 32 hydraulic pressure supply mechanism, 34 transmission output shaft, 52 brake pedal (foot brake), 60 disc brake, 62 BBW mechanism (automatic braking system), 64 parking brake pedal, 70 parking mechanism, 70a parking gear, 70b parking pole, 72 brake switch, 76 wheel speed sensor, 80 range selector, 82 accelerator position sensor, 84 ignition switch, 90 shift controller, 92 engine controller, 98 slope sensor

The invention claimed is:

1. An apparatus for controlling parking of a vehicle, comprising:
   an automatic transmission connected to a power source mounted in the vehicle to change speed of rotation of the power source inputted to an input shaft and transmit from an output shaft to driven wheels;
   a shift-by-wire type parking mechanism that enables a parking gear connected to the output shaft of the automatic transmission to be switched between a rotatable unlocked state and a non-rotatable locked state;
   a foot brake that enables braking of the vehicle in response to brake pedal operation by a driver;
   an automatic braking system that enables braking of the vehicle independently of the aforesaid brake pedal operation;
   a road surface gradient detector adapted to detect a gradient of a road surface where the vehicle is located;
   a vehicle travel speed detector adapted to detect a travel speed of the vehicle; and
   a parking mechanism controller adapted to cause the parking mechanism to execute a parking process to switch the parking gear to the locked state after a predetermined parking condition is established and the detected road surface gradient is equal to or greater than a predetermined value,
   wherein, prior to executing the parking process, the parking mechanism controller determines whether the foot brake has been operated and either
      if it is determined that the foot brake has not been operated, executes a travel speed control for controlling operation of the automatic braking system to make the travel speed of the vehicle greater than zero but equal to or less than the set speed, and then executes the parking process, or
      if it is determined that the foot brake has been operated, executes the parking process, without executing the travel speed control;
   wherein the parking mechanism is a mechanism which establishes the locked state by putting a parking pole in locking engagement with the parking gear, and the set speed is defined as a speed enabling engagement of the parking gear and the parking pole.

2. The apparatus according to claim 1, wherein the predetermined parking condition includes that an opening of a door of the vehicle has been detected.

3. The apparatus according to claim 2, wherein the predetermined parking condition includes that the driver is on board the vehicle.

4. The apparatus according to claim 3, wherein if it is determined that the driver is on board, the parking mechanism controller executes the travel speed control, and if it is determined that the driver is not on board, the parking mechanism controller controls the operation of the automatic braking system to make the vehicle travel speed zero.

5. The apparatus according to claim 1, wherein the road surface gradient detector comprises a slope sensor that is located inside a case mounted horizontally in the vehicle.

6. A method for controlling parking of a vehicle comprising an automatic transmission connected to a power source mounted in the vehicle to change speed of rotation of the power source inputted to an input shaft and transmit from an output shaft to driven wheels; a shift-by-wire type parking mechanism that enables a parking gear connected to the output shaft of the automatic transmission to be switched between a rotatable unlocked state and a non-rotatable locked state; a foot brake that enables braking of the vehicle in response to brake pedal operation by a driver; an automatic braking system that enables braking of the vehicle independently of the aforesaid brake pedal operation; a road surface gradient detector adapted to detect a gradient of a road surface where the vehicle is located; and a vehicle travel speed detector adapted to detect a travel speed of the vehicle, the method comprising:

controlling the parking mechanism to execute a parking process to switch the parking gear to the locked state after a predetermined parking condition is established and the detected road surface gradient is equal to or greater than a predetermined value, wherein the controlling includes, prior to executing the parking process, determining whether the foot brake has been operated and either if it is determined that the foot brake has not been operated, executing a travel speed control for controlling operation of the automatic braking system to make the travel speed of the vehicle greater than zero but equal to or less than the set speed, and then executing the parking process, or if it is determined that the foot brake has been operated, executing the parking process, without executing the travel speed control;

wherein the parking mechanism is a mechanism that establishes the locked state by putting a parking pole in locking engagement with the parking gear, and the set speed is defined as a speed enabling engagement of the parking gear and the parking pole.

7. The method according to claim 6, wherein the predetermined parking condition includes that an opening of a door of the vehicle has been detected.

8. The method according to claim 7, wherein the predetermined parking condition includes that the driver is on board the vehicle.

9. The method according to claim 8, wherein the controlling is such that if it is determined that the driver is on board, the parking mechanism controller executes the travel speed control, and if it is determined that the driver is not on board, the parking mechanism controller controls the operation of the automatic braking system to make the vehicle travel speed zero.

10. The method according to claim 6, wherein the road surface gradient detector comprises a slope sensor that is located inside a case mounted horizontally in the vehicle.

* * * * *